(12) United States Patent
Thuries et al.

(10) Patent No.: US 9,400,906 B2
(45) Date of Patent: Jul. 26, 2016

(54) AUTOMATIC DATA COLLECTION APPARATUS AND METHOD

(71) Applicant: Intermec IP Corp., Fort Mill, SC (US)

(72) Inventors: Serge Thuries, Saint Jean (FR); Alain Gillet, Toulouse (FR)

(73) Assignee: Intermec IP Corp., Fort Mill, SC (US)

( * ) Notice: Subject to any disclaimer, the term of this patent is extended or adjusted under 35 U.S.C. 154(b) by 0 days.

(21) Appl. No.: 14/465,036

(22) Filed: Aug. 21, 2014

(65) Prior Publication Data

US 2015/0053769 A1 Feb. 26, 2015

Related U.S. Application Data

(60) Provisional application No. 61/870,063, filed on Aug. 26, 2013.

(51) Int. Cl.
G06K 7/10 (2006.01)

(52) U.S. Cl.
CPC .... G06K 7/10732 (2013.01); *G06K 2207/1011* (2013.01)

(58) Field of Classification Search
USPC .......... 235/470, 462.21, 462.42, 462.45, 454, 235/472.01
See application file for complete search history.

(56) References Cited

U.S. PATENT DOCUMENTS

| | | | | |
|---|---|---|---|---|
| 6,119,939 A * | 9/2000 | Schwartz | ........... | G06K 7/10732 235/454 |
| 8,256,680 B2 | 9/2012 | Lawson et al. | | |
| 8,517,272 B1 * | 8/2013 | Evans | ................ | G06K 7/10722 235/462.42 |
| 2005/0274806 A1 | 12/2005 | Dant | | |
| 2006/0113389 A1 * | 6/2006 | Barkan | .............. | G06K 7/10732 235/462.21 |
| 2009/0057413 A1 * | 3/2009 | Vinogradov | ........... | G02B 27/20 235/462.35 |
| 2009/0084847 A1 * | 4/2009 | He | ..................... | G06K 7/10722 235/455 |
| 2009/0088203 A1 * | 4/2009 | Havens | ............. | G06K 7/10881 455/556.1 |
| 2012/0193429 A1 | 8/2012 | Van Volkinburg et al. | | |
| 2012/0298755 A1 * | 11/2012 | Lu | ............................ | G06K 7/12 235/468 |
| 2013/0306734 A1 * | 11/2013 | Xian | .................... | G06K 7/1408 235/462.33 |
| 2013/0320092 A1 * | 12/2013 | Bremer | .................... | G06K 7/12 235/472.01 |

\* cited by examiner

*Primary Examiner* — Allyson Trail
(74) *Attorney, Agent, or Firm* — Additon, Higgins & Pendleton, P.A.

(57) ABSTRACT

Machine-readable symbol readers and/or scan engines may subtractively impose an aiming pattern on an illumination field produced by a source of light or illumination. An optical component with a mask or filter are interposed in an optical path extending outwardly from the source of light or illumination. The mask or filter may have a defined shape or configuration to subtractively produce an aiming pattern with a desired shape or configuration. The mask or filter may, or may not, be wavelength selective or spectral. A wavelength selective mask or filter may produce an aiming pattern of a defined color, different from a color of an illumination field. Such may eliminate the need for a separate, distinct source of light or illumination for an aiming beam subsystem. The described structures and methods may reduce size, reduce parts count, and/or simplify manufacture.

21 Claims, 5 Drawing Sheets

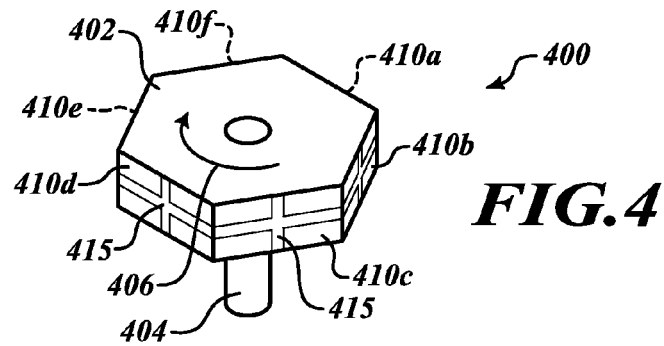
FIG.4
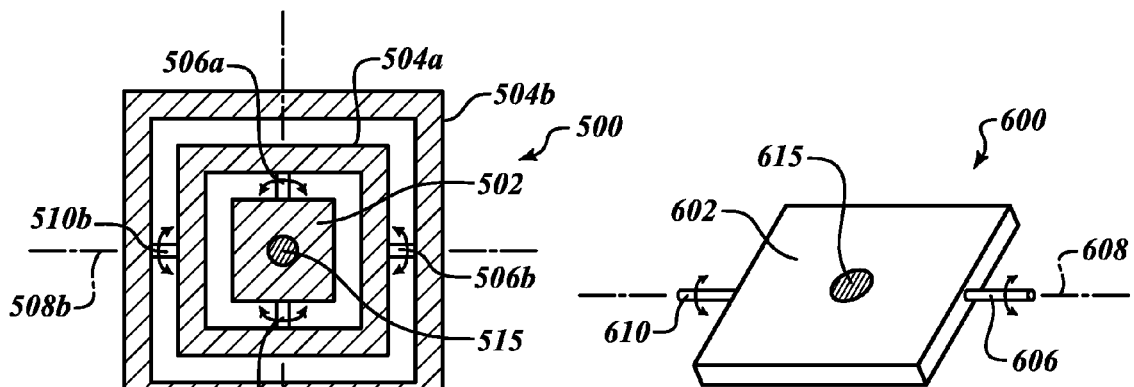
FIG.5
FIG.6
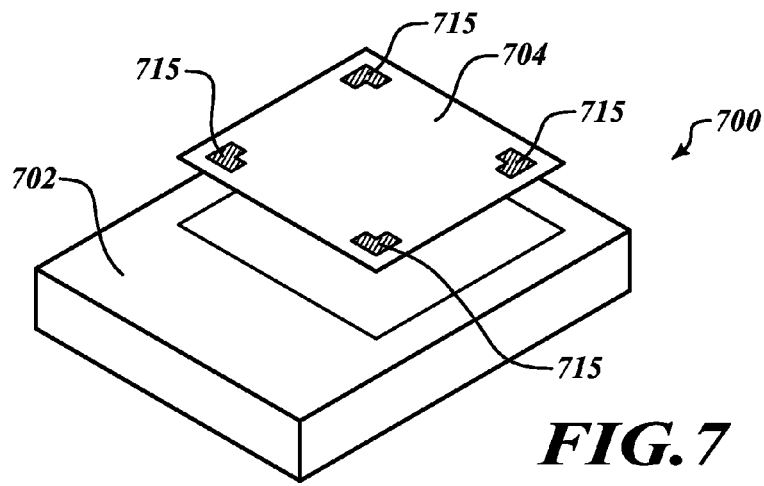
FIG.7

AUTOMATIC DATA COLLECTION APPARATUS AND METHOD

CROSS-REFERENCE TO RELATED APPLICATION

The present application claims the benefit of U.S. Patent Application No. 61/870,063 for an Automatic Data Collection Apparatus and Method filed Aug. 26, 2013. The foregoing patent application is hereby incorporated by reference in its entirety.

BACKGROUND

1. Technical Field

This disclosure generally relates to automatic data collection, in particular to readers and engines to optically read machine-readable symbols, for instance, linear or one-dimensional barcode symbols or two-dimensional area or matrix or stacked code symbols.

2. Description of the Related Art

Various types of readers are employed for reading machine-readable symbols, for instance, linear or one-dimensional barcode symbols or two-dimensional area or matrix or stacked code symbols. Some readers are fixed, for example, those found at grocery stores, supermarkets or other retail establishments, typically at the end of a conveyor belt. Some are portable, for example, handheld readers, typically found in warehouses and office environments. The handheld readers have housings, often with a rectangular shape or shaped as a pistol. The reader may be integrated into a terminal or other device, for instance, with various user input and/or output structures. User input structures may take the form of keypads, keyboards, buttons, user selectable icons, joysticks, thumb sticks, and/or microphones. User output devices may take the form of display screens (e.g., liquid crystal, organic liquid crystal), light emitting diodes, and/or speakers. Readers also typically include one or more communications systems to provide communications with external devices or systems. The communications systems may take the form of one or more radios and associated antennas. For instance, a reader may include a short range wireless radio, for example, one compliant with either BLUETOOTH or WIFI standards and protocols. Additionally or alternatively, the reader may have a longer range wireless radio, for instance, a radio that is compliant with a cellular communications system or network standard and/or protocol. The reader may additionally include one or more wired communications ports, for instance, a Universal Serial Bus® (USB) port, an Ethernet® port, a Firewire® port, and/or Thunderbolt® port.

Automatic data collection devices such as machine-readable symbol readers typically take one of two types, flood illumination systems or scanning spot based systems. Flood illumination systems either provide flood illumination of a target or rely on ambient lighting and capture an image (one- or two-dimensional) of the target. In contrast, scanning based systems sequentially scan a spot or point of light across a target, and produce a scan profile indicative of a magnitude of light returned from the target. The size of the spot is typically small, in order to provide sufficient resolution to read the machine-readable symbol, which is typically made up of patterns of two colors (e.g., black, white) although multi-color machine-readable symbols have been employed.

The machine-readable symbol reader may include one or more illumination or light sources to generate the flood illumination or the scanning spot. For example, the machine-readable symbol reader may include one or more light emitting diodes (i.e., LEDs) or one or more lasers (e.g., laser diodes). Laser light is collimated and coherent, advantageously keeping spot size relatively small over relatively long distances (e.g., 1-3 meters). Machine-readable symbol readers typically include one or more optical components, for example, lenses, mirrors, reflectors, prisms, dichroic mirrors. Scanning spot machine-readable symbol readers typically include one or more moving optical components to scan the light spot or beam in a defined pattern (e.g., raster scan pattern, Lissajous scan pattern). For instance, a scanning spot machine-readable symbol reader may include a rotating polygonal mirror or reflector, or a pivoting mirror or reflector. Pivoting mirrors or reflectors may pivot about one axis or two axes (e.g., perpendicular or orthogonal axes) to produce a desired scan pattern.

The machine-readable symbol reader may include one or more detectors which are responsive to light returned to the machine-readable symbol reader from the target. Detectors may, for example, include photodiodes, photosensors, CMOS optical sensors, or one- or two-dimensional arrays of charged coupled devices (CCDs), Vidicons, etc.

Often one or more of the illumination or light sources, moving optical components, if any, detectors and other optics (e.g., lenses, mirrors, reflectors, prisms, dichroic mirrors) are packaged in a unit commonly referred to as a scan engine. In use the scan engine may, for example, mount to a printed circuit board, for instance, a decode board which carries circuitry that decodes a scan pattern produced by the detectors. While denominated as a scan engine, such are not limited to scanning spot type machine-readable symbol readers, and the term scan engine as used herein and in the claims is not intended to be limited to scanning spot type machine-readable symbol readers.

Light leaving the reader is typically not visible as it passes through the environment (e.g., air), and may or may not be visible when striking the target. Consequently, some machine-readable symbol readers include an aiming beam mechanism, which projects an aiming beam which forms a visible pattern on the target. Such may facilitate aiming or orienting the machine-readable symbol reader with respect to the target or a position on the target. The aiming beam mechanism typically includes dedicated illumination or light sources, which is, or are, separate and distinct from the illumination or light sources that produce the scanning spot or beam. For example, the aiming beam may employ a different color light than the scanning spot or beam.

Often, the aiming beam mechanism is packaged as part of the scan engine. The size of the scan engine disadvantageously limits on how small the machine-reader imager may be made. An alternative approach that allows smaller scan engines, and hence smaller machine-readable symbol readers, is desirable.

SUMMARY

A scanner apparatus may be summarized as including at least one illumination transducer electrically coupleable to a source of electrical power and selectively operable to emit illumination outwardly along a first optical path; and at least a first optical element positioned in the first optical path that extends outwardly from the illumination transducer, the first optical element being subtractive, that is, having a pattern that substantially blocks a portion of the illumination emitted by the illumination transducer to form an aiming pattern.

The first optical element may be at least one of a lens, a transparent cover, a filter, a reflector or a prism. The first optical element may include a mask that forms the pattern.

The pattern may be a spectral filter that substantially blocks a first set of wavelengths and substantially passes a second set of wavelengths to produce the aiming pattern of a defined color. The scanner apparatus may be a scan engine sized and configured to be incorporated into a machine-readable symbol reader. The first optical element may be a reflector rotatably mounted to rotate or pivotally oscillate about an axis, the reflector positioned in the first optical path to scan the illumination emitted by the at least one illumination transducer. The reflector may be one of a polygonal mirror mounted to rotate about the axis or a flat mirror mounted to pivotally oscillate about the axis, the polygonal or the flat mirror having a mask that substantially does not reflect the illumination from some portions of the polygonal or the flat mirror and substantially reflects the illumination from other portions of the polygonal or the flat mirror. The scanner apparatus may further include a reflector rotatably mounted to rotate or pivotally oscillate about an axis, the reflector positioned in the first optical path to scan the illumination emitted by the at least one illumination transducer. The scanner apparatus may be a scan engine sized and configured to be incorporated into a handheld machine-readable symbol reader. The scanner apparatus may further include at least one illumination responsive detector positioned relative to the at least one illumination transducer to detect illumination emitted therefrom along the first optical path after returning from an object along a second optical path. The second optical path may not extend through the first optical element. The scanner apparatus may further include a housing having an interior and at least a first window providing optical communication between the interior and exterior of the housing, the at least one illumination transducer and the detector each received in the interior of the housing, at least the first optical path extending through the first window. The housing may include a second window including at least one of a lens or a transparent cover, the second optical path extending through the second window. The at least one illumination transducer may consist of a single laser diode, and may further include: the source of electrical power; and at least one switch operable to selectively electrically couple the electrical power to the illumination transducer. The aiming pattern may be concentric with an illumination field emitted by the illumination transducer. The aiming pattern and an illumination field emitted by the illumination transducer may each have at least one axis of symmetry in common with one another.

A scanner apparatus may be summarized as including at least one illumination transducer electrically coupleable to a source of electrical power and selectively operable to emit illumination outwardly along a first optical path as an illumination field; and an optical element positioned in the first optical path that extends outwardly from the illumination transducer, the illumination field including an aiming pattern in the form of an absence of illumination in one or more portions of the illumination field.

The optical element may include a spectral filter that substantially blocks a first set of wavelengths and substantially passes a second set of wavelengths to produce the aiming pattern of a defined color. The spectral filter may have a defined spatial shape. The optical element may have a mask pattern that substantially blocks a portion of the illumination emitted by the illumination transducer to form the aiming pattern. The optical element may be at least one of a lens, a transparent cover, a filter, a reflector or a prism.

A method of producing a scanner apparatus may be summarized as including emitting illumination via at least one illumination transducer outwardly along a first optical path to pass the illumination via at least a first optical element in the first optical path that extends outwardly from the illumination transducer, the first optical element having a pattern that substantially blocks a portion of the illumination emitted by the illumination transducer to form an aiming pattern.

Emitting illumination via at least one illumination transducer may include emitting the illumination to pass through a spectral filter that substantially blocks a first set of wavelengths and substantially passes a second set of wavelengths to produce the aiming pattern of a defined color. Emitting illumination via at least one illumination transducer may include emitting the illumination to pass through a mask that substantially blocks a first portion of the illumination and substantially passes a second portion of the illumination to produce the aiming pattern of a defined spatial configuration. The method may further include providing at least one illumination responsive detector and positioning said at least one illumination responsive detector relative to the at least one illumination transducer to detect illumination emitted therefrom along the first optical path after return from an object along a second optical path.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 4 is an isometric view of a movable optical component in the form of a rotating polygonal mirror or reflector, which may be used in, or in conjunction with, the scan engine illustrated in FIG. 1, according to at least one illustrated embodiment.

FIG. 5 is a top plan view of a movable optical component in the form of a micro-machined electronic structure (MEMS) mirror or reflector, which oscillatingly pivots about two perpendicular axes to create a scan pattern, and which may be used in, or in conjunction with, the scan engine illustrated in FIG. 1, according to at least one illustrated embodiment.

FIG. 6 is an isometric view of a movable optical component in the form of a mirror or reflector, which oscillatingly pivots about an axis to create a scan pattern, and which may be used in, or in conjunction with, the scan engine illustrated in FIG. 1, according to at least one illustrated embodiment.

FIG. 7 is an isometric, partially exploded, view of a light or illumination source and an optical element to produce an aiming pattern, which may be used in, or in conjunction with, the scan engine illustrated in of FIG. 1, according to at least one embodiment.

DETAILED DESCRIPTION

Figure 1:
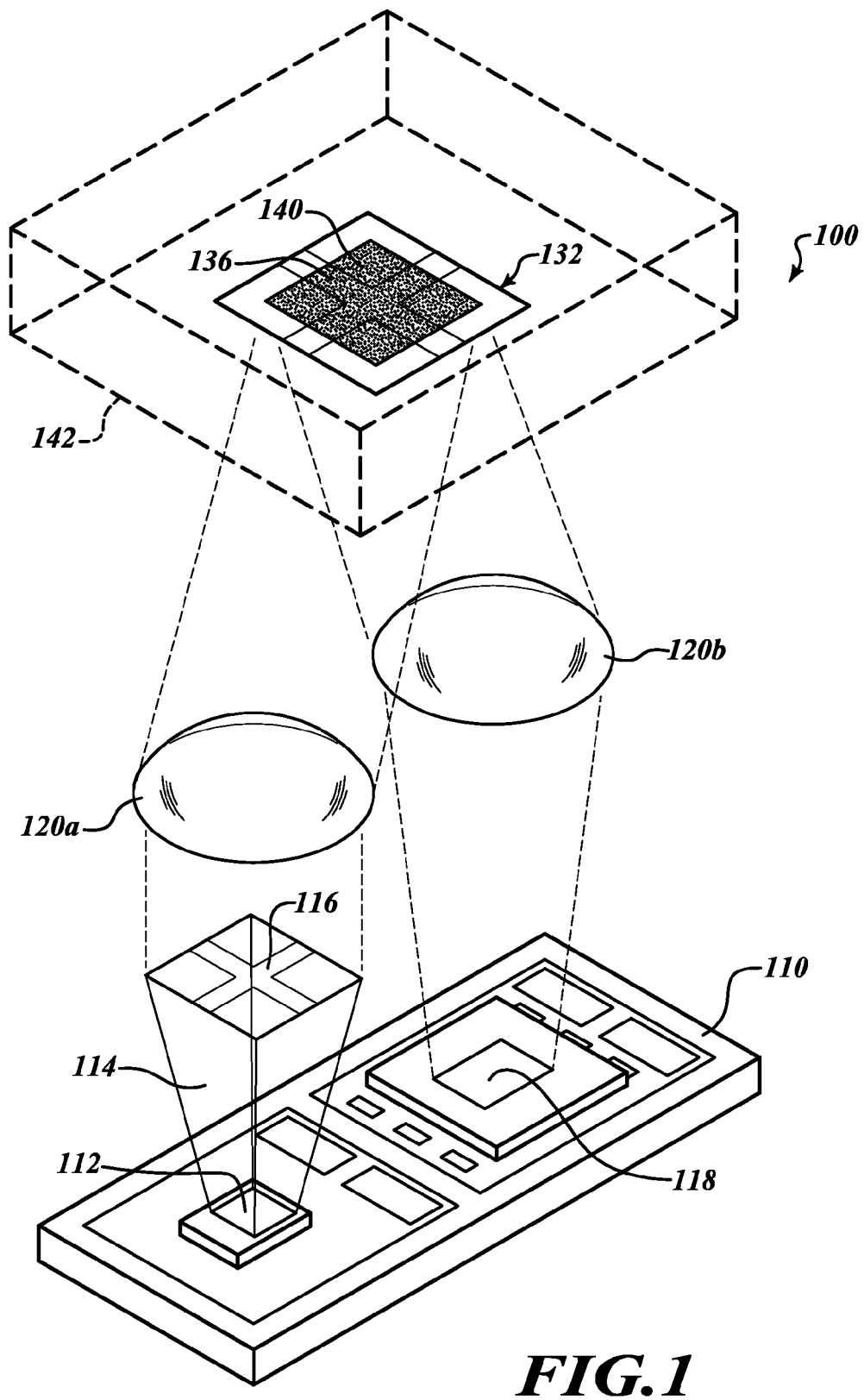
FIG. 1 is a schematic diagram of an object bearing a machine-readable symbol and a scan engine and lenses positioned to project an aiming beam at, and to read, the machine-readable symbol, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with automatic data collection devices, for instance, machine-readable symbol readers, light or illumination sources, light or illumination sensors or detectors, processors, non-transitory processor readable media, buses, and communications subsystems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, such as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

A machine-readable symbol reader optically reads information encoded in machine-readable symbols, for instance, linear or one-dimensional barcode symbols or two-dimensional area or matrix or stacked code symbols. The machine-readable symbol reader may, for example, include a scan engine. The scan engine may include one or more light or illumination sources (e.g., LEDs, laser diodes or other source of collimated light) that illuminate a symbol to be read. As discussed above, a flood illumination type of machine-readable symbol reader may emit light to flood illuminate the target. As also discussed above, a scan or flying spot type machine-readable symbol reader emits a scanning spot or beam to sequentially illuminate the target in a defined scan pattern. The scan engine may also include one or more optical components. For example, a scan or flying spot type machine-readable symbol reader may include one or more movable (e.g., rotatable, oscillatingly pivotable) optical components which causes the scan spot or beam to move or scan in a defined pattern (e.g., raster scan pattern, Lissajous scan pattern). As further discussed above, conventional scan engines may further include one or more light or illumination sources (e.g., light emitting diodes or other source of light) that generate an aiming pattern or beam. For various reasons, the light or illumination source(s) that generate the aiming pattern or beam are typically separate and distinct from the light or illumination source(s) that generate the flood illumination field or scanning spot or beam.

The use of separate and distinct light or illumination sources result in an undesirably large package or scan engine. The size of the scan engine unnecessarily limits reduction in the size of the machine-readable symbol reader. This disclosure describes and illustrates various structures and approaches for reducing a size of a scan engine and/or machine-readable symbol reader. A broader range of devices and/or applications may take advantage of scan engines with aiming beam mechanisms which are smaller than those currently available.

In least some aspects, a common source of light or illumination produces both the aiming pattern or aiming beam and the illumination field or the scanning spot or scanning beam. In particular, a portion of light or illumination emitted or produced by the light or illumination source may be substantially blocked or reduced, to create the aiming beam or aiming pattern. For example, a mask having a defined spatial pattern may substantially block all or almost all wavelengths of light or illumination, to produce an aiming pattern or beam. Also, for example, a spectral filter having a defined spatial pattern and a defined spectral filtering profile may substantially remove a set of wavelengths from the light or illumination, to produce an aiming pattern or beam of a defined color. As used herein and in the claims, the term "substantially" means a sufficient amount to be visually perceptible via the human vision system. The light or illumination source is a transducer, converting energy, typically electrical power, into light or illumination of some defined wavelengths (e.g., white light). The mask or filter may be formed in, on, or otherwise carried by one or more optical components, for instance, a lens or cover. As used herein and in the claims, a lens does not necessarily need to magnify, focus or collimate light to constitute a lens, but rather can pass light substantially unchanged (i.e., transparent cover). The mask or filter, or some other approach, subtracts a portion of light to form the aiming pattern and/or aiming beam, imposed on either the flood illumination field or on an illumination field formed by the scanning spot over time (e.g., one complete cycle or an integral multiple of complete cycles of a scan pattern).

The use of a common source of light or illumination to produce both the illumination field and the aiming pattern or aiming beam substantially reduces a size of the scan engine, reduces the number of active components thereof, and generally simplifies the design and structure of the scan engine.

Figure 2:
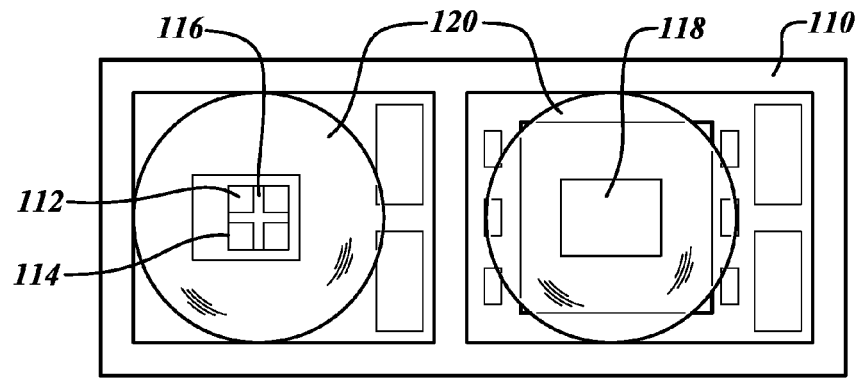
FIG. 2 is a top plan view of the scan engine illustrated in FIG. 1.

FIG. 1 shows a target 142 bearing a machine-readable symbol 140 and a portion of a machine-readable symbol reader 100 including a scan engine 110 and optional lenses 120a, 120b (two shown, collectively 120), according to at least one illustrated embodiment. FIG. 2 shows the scan engine 110 in isolation.

The scan engine 100 and a first lens 120a are positioned to project an illumination field 132 toward the target 142 and machine-readable symbol 140. The scan engine 100 and a second lens 120b are positioned to detect light or illumination returned from the target 142 and machine-readable symbol 140, whether by reflection, refraction or florescence. The scan engine 100 subtractively imposes an aiming pattern 136 on the illumination field 132. One or both lenses 120 may be collimating lenses which collimate light passing therethrough.

The scan engine 110 includes one or more sources of light or illumination 112, an optical component 116 that subtractively imposes an aiming pattern on light or illumination emitted by the source(s) of light or illumination, and a detector 118 responsive to at least some wavelengths of light or illumination returned from the target.

The source(s) of light or illumination 112 (i.e., transducer(s) that convert energy into light or illumination) may take a variety of forms. For example, the source(s) of light or illumination 112 may take the form of one or more LEDs, for instance, an LED wafer or chip with one or more distinct LEDs. The LEDs may emit light or illumination in a defined range of wavelengths, for instance, white or substantially white light. Also, for example, the source(s) of light or illumination 112 may take the form of one or more sources of collimated light, for instance, lasers, such as a laser diode wafer or chip. The laser diode may emit light or illumination in a defined range of wavelengths, for instance, white or substantially red light.

The optical component 116 may take any of a variety of forms. The optical component 116 may be fixed with respect to the source(s) of light or illumination 112 or moveable with respect thereto. The optical component 116 may, for example, take the form of a lens, mirror or reflector, prism, dichroic mirror, or gel, having a mask or a filter. The mask or filter may be integrated into, carried on, or otherwise embodied in or associated with the optical component 116. The mask may be in the form of defined spatial pattern (e.g., cross, brackets, concentric circles target symbol), for example, deposited on a surface of the optical component 116. The mask substantially blocks light or illumination emitted by the source(s) of light or illumination 112, to subtractively impose the aiming pattern on the light or illumination emitted thereby. The filter may be in the form of a spectral filter, for example, deposited on a surface of the optical component. The filter substantially blocks a defined range of wavelengths of light or illumination emitted by the source(s) of light or illumination 112, while substantially passing another defined range, to subtractively impose the aiming pattern on the light or illumination emitted thereby. The result of the filter may be an aiming pattern of a defined color, different than a color of an illumination field, if the illumination field is visible. While the mask or filter are illustrated as being part of or carried by the optical component 116, the mask or filter may instead be part of or incorporated in the first lens 120a The detector 118 may take a variety of forms which are responsive to at least some wavelengths of light or illumination returned from the target. The detector is a transducer that converts light or illumination into a signal, typically a voltage or current. The detector 118 may, for example, take the form of one or more photodiodes, photosensors, CMOS optical sensors, or one- or two-dimensional arrays of charged coupled device (CCDs), Vidicons, etc. While FIGS. 1 and 2 illustrate the detector 118 as in integral component of the scan engine 110, such should not be considered limiting. The detector 118 may be an individual component supplied separately from the scan engine 110, for example, as part of a decode circuit board.

The scan engine 110 may optionally include a light pipe 114. The light pipe 114 may be any light guide providing a channel for the propagation of light or illumination from the source(s) of light or illumination 112 to the optical component 116.

In operation, the source(s) of light or illumination 112 selectively emit, generate or produce light or illumination. The optional light pipe 114 provides an optical path for the light or illumination toward the optical component 116, which is outwardly positioned along the optical path from the source(s) of light or illumination 112. The light or illumination thus passes through the mask or filter of the optical component 116, subtractively creating an aiming pattern in the resultant illumination field. As previously noted, the first lens 120a may be a collimating lens, which produces a collimated beam which generally does not appreciably spread as the beam traverses the distance between the first lens 120a and the target or machine-readable symbol 140.

The resultant illumination field 132 with the aiming pattern 136 is best illustrated in FIG. 1, shown interposed on and around the machine-readable symbol 140. The illumination field 132 and the aiming pattern 136 may be concentric or in registration with one another, or the illumination field 132 and the aiming pattern 136 may have at least one axis of symmetry in common with one another. Such facilitates orienting the machine-readable symbol reader with respect to a machine-readable symbol to properly read the machine-readable symbol.

As previously noted the second lens 120b may be a collimating lens that directs collimated light or illumination returned from the machine-readable symbol 140 to the detector(s) 118.

As noted above, the scan engine 110 and/or machine-readable symbol reader 100 may include one or more additional optical components (e.g., lenses, dynamically configurable lenses, microfluidic lenses, mirrors, reflectors, prisms, dichroic mirrors), which have been omitted from FIGS. 1 and 2 to simplify the illustration and description. For instance, the machine-readable symbol reader 100 may include one or more moving optical components if the machine-readable symbol reader 100 is a scanning type device.

Thus, aspects and embodiments for producing an aiming pattern in an illumination field may be subtractive, producing the aiming pattern through removal of illumination of one or more wavelengths in a pattern spatially corresponding to the aiming pattern. In one embodiment, a reflector or lens interposed with a subtractive pattern subtractively imposes an aiming pattern on the light or illumination generated, produced or emitted by the light or illumination source(s) 112.

By interposing a subtractive optical component 116 in an optical path of outward traveling light or illumination, an aiming pattern is formed or imposed in the corresponding illumination field. The aiming pattern is thus visibly perceptible at or proximate the target or machine-readable symbol 140. The subtractive optical component 116 may be placed in the optical path at any number of positions, so long as light or illumination is substantially blocked or filtered according to some spatial pattern. For example, the subtractive pattern (e.g., mask, filter) may be carried on, or integrated into, the first lens 120a. Also, for example, the subtractive pattern (e.g., mask, filter) may be positioned behind the first lens 120a. As another example, the subtractive pattern may be on a face of the light or illumination source(s) 112, for instance, on a clear or colored lens that covers a die or wafer. The subtractive mask or pattern may, for instance, be formed by a material deposited on the light or illumination source(s) 112.

Figure 3:
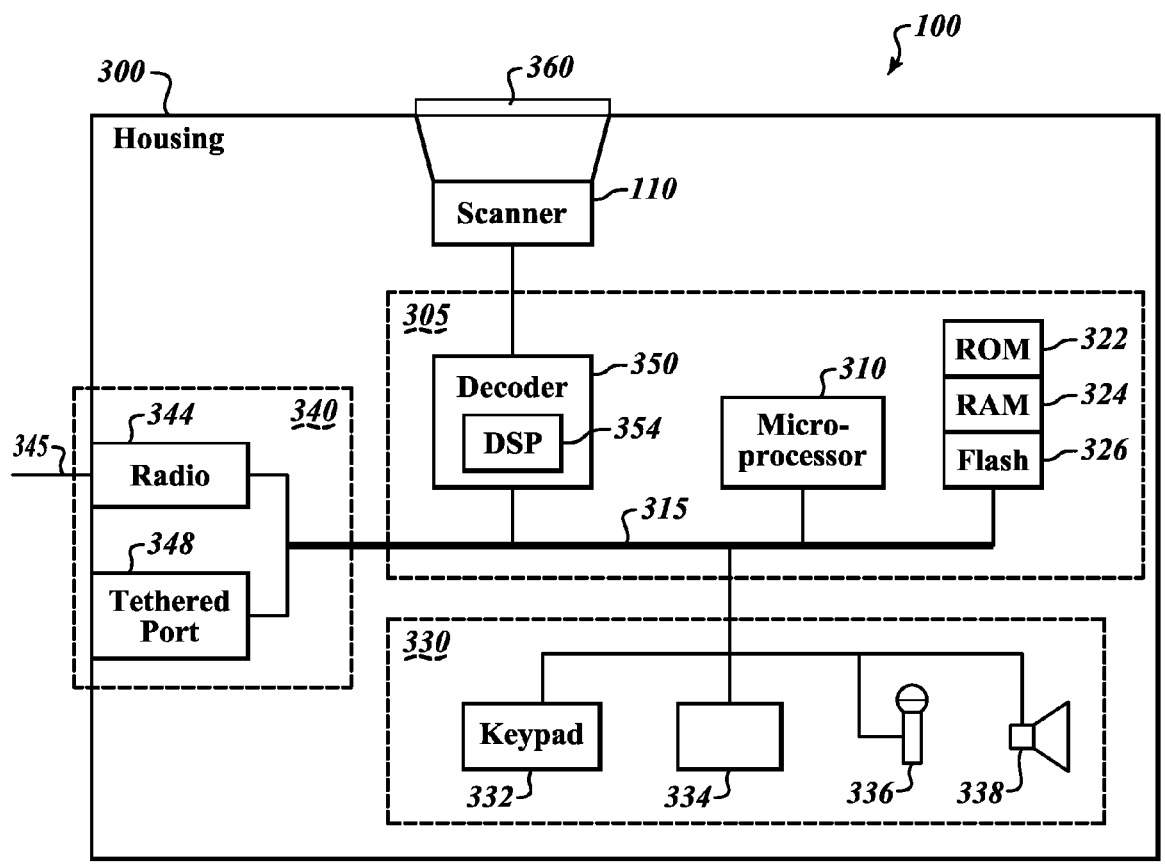
FIG. 3 is a block diagram of a machine-readable symbol reader, including a housing, circuitry and the scan engine of FIG. 1, according to at least one illustrated embodiment.

FIG. 3 shows a portion of a machine-readable symbol reader 100 which incorporates the scanner engine 110, according to at least one illustrated embodiment.

The machine-readable symbol reader 100 includes a housing 300 which houses various components. The housing 300 may take any of a variety of forms, and may have any of a large variety of shapes. For example, the housing may have a handheld form factor, for instance, in the shape of a pistol or a rectangular box.

The machine-readable symbol reader 100 includes a control subsystem 305 for controlling operation of the machine-readable symbol reader 100. The control subsystem 305 may include one or more controllers, for instance, processors such as microprocessors 310, digital signal processors (DSPs) 354, graphical processing units (GPUs) (not shown), application specific integrated circuits (ASICs) (not shown), programmable gate arrays (PGAs) (not shown), programmable logic controllers (PLCs) (not shown), etc. The control subsystem 305 may also include one or more non-transitory computer- or processor-readable devices, for instance, one or more memories such as read only memory (ROM) 322, random access memory (RAM) 324, and/or Flash memory 326, or other forms of static or dynamic memory. While not illustrated, the control subsystem 305 may include other non-transitory media, for instance, spinning media such as a magnetic hard disk and hard disk drive (not shown) and/or optical disk and optical disk drive (not shown). The microprocessor(s) 310, GPUs, DSPs, ROM, RAM, FLASH, and/or other components are communicatively coupled via one or more communicative paths, for instance, one or more buses (only one illustrated) 315. The buses 315 may, for example, include a power bus, instruction bus, data bus, address bus, etc.

The machine-readable symbol reader 100 also includes a user interface 330. The user interface 330 may be communicatively coupled to, and controlled by, the microprocessor 310 via the bus 315. The user interface 330 may comprise a number of user input and/or user output components. For example, the user interface 330 may include a keypad 332, keys, switches, buttons, touch screen 334 with user selectable icons, switches, trackpad, trackball, joy or thumbstick and/or microphone 336 as user input devices. Also, for example, the user interface may include a display, lights, speaker(s) 338, and/or tactile or vibratory transducer as user output devices.

The machine-readable symbol reader 100 may include a communications subsystem 340 to allow communications with devices, systems and/or networks external to the machine-readable symbol reader 100. The communications subsystem 340 may include one or more transmitters, receivers or transceivers (collectively radios 344) to allow wireless communications. For example, the machine-readable symbol reader 100 may include radios 344 (only one shown) and associated antennas 345 (only one shown) for wireless communications via various communications standards and/or protocols, for instance, BLUETOOTH, WIFI, or cellular. The communications subsystem 340 may include one or more tethered ports 348 (only one shown) to allow wired or optical (collectively tethered) communications. For example, communications via various communications standards and/or protocols, for instance, USB, ETHERNET, FIREWIRE, or THUNDERBOLT standards and protocols. The radio(s) 344 and tethered port(s) 348 may be communicatively coupled to the bus 315.

The scan engine 110 is communicatively coupled to a decoder board 350, which may include one or more DSPs 354 or GPUs (not shown) and associated decoder circuitry (e.g., analog-to-digital converter, buffer). The decoder board 350 operates to decode the signal (e.g., scan line, one-dimensional or two-dimensional image data) produced by light returned to the machine-readable symbol reader 100 from the target or machine-readable symbol 140 (FIG. 1). Such may employ conventional decoding techniques.

In operation, the microprocessor 310 may cause actuation of one or more light or illumination sources of the scan engine 110, to provide light or illumination outwardly from a window 360 in the housing 300, for example, through a transparent cover or lens. The detector(s) 118 of the scan engine 110 receive light or illumination returned to the machine-readable symbol reader 100, and generates one or more signals indicative thereof. The decoder board 350 and DSP 354 may receive the signals from the scan engine 110, and process the signals to decode information encoded in a machine-readable symbol 140 (FIG. 1). Optionally, the microprocessor 310 may perform additional manipulation or processing on the decoded information, for example, transmitting such via the radio(s) 344 and/or tethered port(s) 348.

Scanning or flying spot type machine-readable symbol readers typically include one or more moving optical components (e.g., mirrors or reflectors) to scan the illumination spot or beam in a defined pattern. FIGS. 4-6 show some examples of moving optical components.

In particular, FIG. 4 shows a rotating mirror or reflector device 400, according to at least one illustrated embodiment. The rotating mirror or reflector device 400 includes a polygonal mirror or reflector 402 having multiple reflection faces 410a-410f (six shown, collectively 410). The polygonal mirror or reflector 402 is attached to an axle 404 which is driven, for instance, by an electric motor (not shown) to rotate about a rotation axis, as indicated by arrow 406. Each reflection face 410 may include or bear a mask or filter 415, having a defined shape to subtractively impose an aiming pattern on an illumination field reflected off the respective reflection face 410. The mask or filter 415 may be printed or deposited on the reflection faces or etched therein.

The rotating mirror or reflector device 400 may be positioned in an optical path of the source(s) of light or illumination 112 (FIGS. 1 and 2) of the scan engine 110. As the polygonal mirror or reflector 402 rotates, light or illumination reflected off the reflection faces 410 have the aiming pattern subtractively imposed thereon.

FIG. 5 shows a pivoting microelectromechanical system (MEMS) reflector device 500, according to at least one illustrated embodiment.

The pivoting MEMS reflector device 500 comprises a mirror or reflector 502, and a pair of frames 504a, 504b (collectively 504). The mirror or reflector 502 includes or bears a mask or filter 515 which subtractively imposes an aiming pattern on light or illumination reflected by the mirror or reflector 502. The mask or filter 515 may be printed or deposited on a face of the mirror or reflector 502 or etched therein. A first axle or pair of axles 506a pivotally couples the mirror or reflector 502 to the first frame 504a for oscillating pivotal motion about a first axis 508a, as indicated by double headed arrows 510a (only one called out). A second axle or pair of axles 506b pivotally couples the first frame 504a to the second frame 504b for oscillating pivotal motion about a second axis 508b, as indicated by double headed arrows 510b (only one called out). The first and second axes, collectively 508, may be perpendicular to one another, and the orthogonal to an optical axis (extending perpendicularly out of plane of drawing sheet) of the mirror or reflector 502. The pivoting MEMS reflector device 500 may include a number of electrodes (not illustrated) to apply a drive force (e.g., electrical potential or voltage), to cause the mirror or reflector 502 to oscillate about the first axis 508a, and to cause the first frame 504a to oscillate about the second axis 508b.

The mirror or reflector 502 may be positioned in an optical path of the source(s) of light or illumination 112 (FIGS. 1 and 2) of the scan engine 110. As the mirror or reflector 502 pivots, light or illumination reflected off the reflection face thereof has the aiming pattern subtractively imposed thereon.

FIG. 6 shows a pivoting mirror reflector device 600, according to at least one illustrated embodiment.

The pivoting mirror reflector device 600 includes a mirror or reflector 602. The mirror or reflector 602 may, for example, take the form of a flat mirror or reflector. The mirror or reflector 602 has or carries a mask or filter 615 in a defined spatial pattern. For example, the mirror or reflector 602 may include a frosted area 615, for example, with little or substantially reduced reflective properties at one or more wavelengths. The mask or filter 615 is illustrated as circular or oval, although other shapes or patterns may be employed.

The pivoting mirror reflector device 600 may include one or more axles 606 which pivotally mount the mirror or reflector 610 for oscillation about an axis 608, as indicated by double headed arrows 610 (only one called out). The axle(s) 606 may be oscillatingly driven, for example, via an electric motor (not shown) and appropriate drive train or mechanism.

The mirror or reflector 602 may be positioned in an optical path of the source(s) of light or illumination 112 (FIGS. 1 and 2) of the scan engine 110. As the mirror or reflector 602 pivots, light or illumination reflected off the reflection face thereof has the aiming pattern subtractively imposed thereon via the mask or filter 615.

FIG. 7 shows a source of light or illumination 700 which includes a die, wafer or chip 702 and an integral mask or filter optical component 704, according to at least one illustrated embodiment.

In particular, the die or wafer 702 may take the form of a silicon or other semiconductor fabrication, for instance, an LED or laser diode die, wafer or chip. Such dies, wafers or chips often include a lens integrally formed therewith. The lens typically provides environmental protection to the electrical or electronic components of the die, wafer or chip, for example, hermetically sealing and/or electrically isolating those components from the ambient environment. The lens may, for example, take the form of a transparent cover or encapsulant.

As illustrated, the integral mask or filter optical component 704 includes a mask or filter pattern 715. For example, the mask or filter pattern 715 may be printed or deposited on a surface (e.g., inner or outer face) of the integral mask or filter optical component 704. Also, for example, the mask or filter pattern 715 pattern may be formed by selectively depositing a reflective material (e.g., aluminum) on a surface, omitting the reflective material (e.g., via a stencil or mask) from those portions that will subtractively form the aiming beam pattern. Alternatively, the mask or filter pattern 715 may be etched into a surface (e.g., inner or outer face) of the integral mask or filter optical component 704. The integral mask or filter optical component 704 may be positioned directly adjacent the die, wafer or chip, and may be secured via an adhesive. The adhesive should not have an adverse effect on the optical characteristics of light or illumination emitted, generated or produced by the die, wafer or chip 702.

The integral mask or filter optical component 704 is inherently positioned in an optical path of the source(s) of light or illumination (i.e., die, wafer or chip 702) of the scan engine 110. As light or illumination passes through the integral mask or filter optical component 704, a spatial pattern is subtractively removed. As previously noted, the mask or filter 715 may be spectrally selective. Thus, only some sets of wavelengths may be removed from the spatial pattern, resulting in an aiming beam pattern of a desired set of wavelengths or colors.

Figure 8:
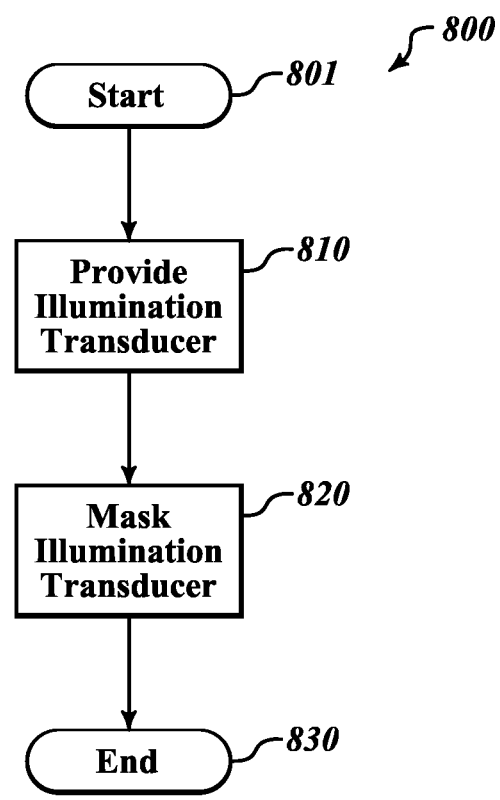
FIG. 8 is a flow diagram showing a method of producing an aiming beam and illuminating a target via a scan engine such as that illustrated in FIG. 1, according to at least one illustrated embodiment.

FIG. 8 shows a method 800 of building a scan engine or machine-readable symbol reader, according to at least one illustrated embodiment.

The method 800 begins or starts at 801.

At 810, one or more sources of light or illumination are provided. As discussed above, the source(s) of light or illumination may be a white LED die, wafer or chip, or some other source of electromagnetic energy which produces illumination in, for example, a visible portion of the electromagnetic spectrum. The source(s) of light or illumination emits, generates or produces light or illumination, outwardly along an optical path. Using a white LED as an example, white light is emitted from the LED in a direction opposite a base of the LED, thus resulting in an optical path extending outward from a face of the LED.

At 820, an optical element including a mask or filter is inserted or positioned in the optical path. The mask or filter has a defined shape that results in a corresponding aiming pattern subtractively imposed on an illumination field which the source(s) of light or illumination emits, generates or produces. For example, a cross-shaped mask or filter may be deposited or carried on the face of the LED. This mask or filter may be wavelength selective, substantially blocking a first set of wavelengths while substantially passing a second set of wavelengths. The resulting light or illumination in the aiming pattern will appear to be a defined color (e.g., red). Thus, a colored cross forming an aiming pattern is subtractively formed in the illumination field produced by the LED. The mask or filter should be positioned relative to the LED such that the aiming pattern is centered in or is at least axial symmetric with the illumination field. As previously noted, the illumination field may, for example, be white light, while the aiming pattern may be a constituent color of white light (e.g., red). Consequently, by interposing the optical element with the mask or filter in the optical path, both aimer and illumination functionality may be realized with a common source of light or illumination.

The method 800 ends or terminates at 830.

Figure 9:
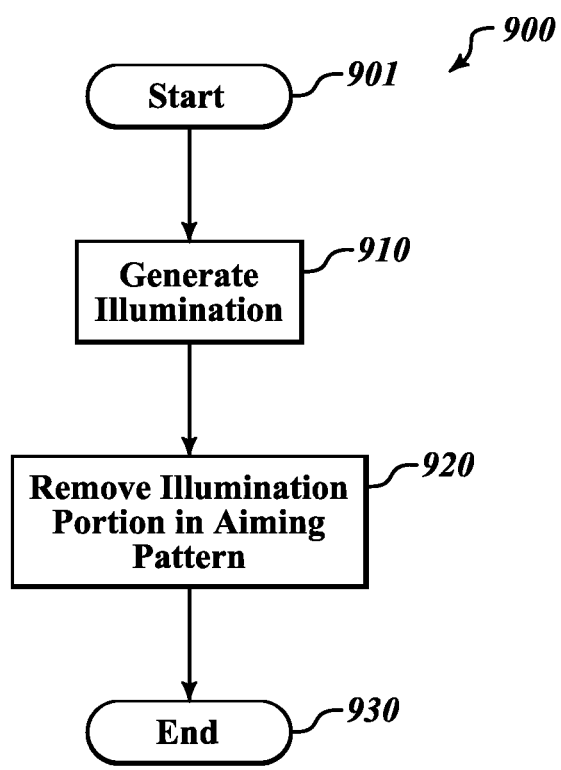
FIG. 9 is a flow diagram showing a method of producing an aiming beam and illuminating a target via a scan engine such as that illustrated in FIG. 1, according to at least one illustrated embodiment.

FIG. 9 shows a method 900 of operating a scan engine or machine-readable symbol reader, according to at least one illustrated embodiment.

The method 900 begins or starts at 901.

At 910, one or more sources of light or illumination emit, generate or produce light or illumination. For example, a controller may cause one or more LEDs to emit, generate or produce light or illumination. The illumination substantially traverses an optical path extending outward from a face of the LEDs.

At 920, a mask or filter subtractively removes a portion of the light or illumination which the one or more sources of light or illumination emit, generate or produce. In particular, the mask or filter may remove light or illumination in a spatial pattern, which defines an aiming pattern. As previously noted, the mask or filter may be part of or carried by an optical element. Also as previously noted, the mask or filter may be wavelength selective or a spectral mask or filter. The mask or filter may have any desired spatial configuration or shape, including contiguous and non-contiguous shapes or patterns.

Flowchart 900 ends at 930.

While in the above, producing the aiming pattern in illumination has generally been described with regard to a single monolithic optical element, this is by way of convenience for explanation and is not meant to be limiting with regard to aiming pattern generation in the illumination. For example, a portion of the aiming pattern may be formed by a first filter and a portion of the aiming pattern may be formed by a second filter, and these filters may be positioned at different positions or locations in the optical path extending outwardly from the transducer. That is, the aiming pattern may be formed by multiple elements in conjunction, and these elements may be located apart or together in the optical path associated with illumination emitted by the transducer.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary object evaluation system generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or may be implemented in standard integrated circuits.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet that are commonly assigned to the same assignee of this application are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A scanner apparatus, comprising:
   at least one illumination transducer electrically coupleable to a source of electrical power and selectively operable to emit illumination outwardly along a first optical path;
   at least a first optical element positioned in the first optical path that extends outwardly from the illumination transducer, the first optical element having a pattern that substantially blocks a portion of the illumination emitted by the illumination transducer to form an aiming pattern;
   at least one illumination responsive detector positioned relative to the at least one illumination transducer to detect illumination emitted therefrom along the first optical path after return from an object along a second optical path; and
   a housing having an interior and at least a first window providing optical communication between the interior and an exterior of the housing, the at least one illumination transducer and the detector each received in the interior of the housing, at least the first optical path extending through the first window;
   wherein the housing includes a second window including at least one of a lens or a transparent cover, the second optical path extending through the second window.

2. The scanner apparatus of claim 1 wherein the first optical element is at least one of a lens, a transparent cover, a filter, a reflector or a prism.

3. The scanner apparatus of claim 1 wherein the first optical element includes a mask that forms the pattern.

4. The scanner apparatus of claim 1 wherein the pattern is a spectral filter that substantially blocks a first set of wavelengths and substantially passes a second set of wavelengths to produce the aiming pattern of a defined color.

5. The scanner apparatus of claim 1 wherein the scanner apparatus is a scan engine sized and configured to be incorporated into a machine-readable symbol reader.

6. The scanner apparatus of claim 5 wherein the first optical element is a reflector rotatably mounted to at least one of rotate or pivotally oscillate about an axis, the reflector positioned in the first optical path to scan the illumination emitted by the at least one illumination transducer.

7. The scanner apparatus of claim 6 wherein the reflector is one of a polygonal mirror mounted to rotate about the axis or a flat mirror mounted to pivotally oscillate about the axis, the polygonal or the flat mirror having a mask that substantially does not reflect the illumination from some portions of the polygonal or the flat mirror and substantially reflects the illumination from other portions of the polygonal or the flat mirror.

8. The scanner apparatus of claim 5, comprising:
   a reflector rotatably mounted to at least one of rotate or pivotally oscillate about an axis, the reflector positioned in the first optical path to scan the illumination emitted by the at least one illumination transducer.

9. The scanner apparatus of claim 1 wherein the scanner apparatus is a scan engine sized and configured to be incorporated into a handheld machine-readable symbol reader.

10. The scanner apparatus of claim 1 wherein the second optical path does not extend through the first optical element.

11. The scanner apparatus of claim 1 wherein the at least one illumination transducer consists of a single laser diode, and comprising:
   the source of electrical power; and
   at least one switch operable to selectively electrically couple the electrical power to the illumination transducer.

12. The scanner apparatus of claim 1 wherein the aiming pattern is concentric with an illumination field emitted by the illumination transducer.

13. The scanner apparatus of claim 1 wherein the aiming pattern and an illumination field emitted by the illumination transducer each have at least one axis of symmetry in common with one another.

14. A scanner apparatus, comprising:
   at least one illumination transducer electrically coupleable to a source of electrical power and selectively operable to emit illumination outwardly along a first optical path as an illumination field;
   an optical element positioned in the first optical path that extends outwardly from the illumination transducer, the illumination field including an aiming pattern in the form of an absence of illumination in one or more portions of the illumination field;
   at least one illumination responsive detector positioned relative to the at least one illumination transducer to detect illumination emitted therefrom along the first optical path after return from an object along a second optical path; and a housing having an interior and at least a first window providing optical communication between the interior and an exterior of the housing, the at least one illumination transducer and the detector each received in the interior of the housing, at least the first optical path extending through the first window;

wherein the housing includes a second window including at least one of a lens or a transparent cover, the second optical path extending through the second window.

15. The scanner apparatus of claim 14 wherein the optical element includes a spectral filter that substantially blocks a first set of wavelengths and substantially passes a second set of wavelengths to produce the aiming pattern of a defined color.

16. The scanner apparatus of claim 15 wherein the spectral filter has a defined spatial shape.

17. The scanner apparatus of claim 14 wherein the optical element has a mask pattern that substantially blocks a portion of the illumination emitted by the illumination transducer to form the aiming pattern.

18. The scanner apparatus of claim 17 wherein the optical element is at least one of a lens, a transparent cover, a filter, a reflector or a prism.

19. A method of forming an aiming pattern for a scanner apparatus, comprising:

emitting illumination via at least one illumination transducer outwardly along a first optical path to pass the illumination via at least a first optical element in the first optical path that extends outwardly from the illumination transducer, the first optical element having a pattern that substantially blocks a portion of the illumination emitted by the illumination transducer to form an aiming pattern;

providing at least one illumination responsive detector and positioning said at least one illumination responsive detector relative to the at least one illumination transducer to detect illumination emitted therefrom along the first optical path after return from an object along a second optical path;

providing a housing having an interior and at least a first window providing optical communication between the interior and an exterior of the housing, the at least one illumination transducer and the detector each received in the interior of the housing, at least the first optical path extending through the first window; and providing a second window in the housing including at least one of a lens or a transparent cover, the second optical path extending through the second window.

20. The method of claim 19 wherein emitting illumination via at least one illumination transducer comprises emitting the illumination to pass through a spectral filter that substantially blocks a first set of wavelengths and substantially passes a second set of wavelengths to produce the aiming pattern of a defined color.

21. The method of claim 19 wherein emitting illumination via at least one illumination transducer comprises emitting the illumination to pass through a mask that substantially blocks a first portion of the illumination and substantially passes a second portion of the illumination to produce the aiming pattern of a defined spatial configuration.

* * * * *